(12) United States Patent
Hewitt et al.

(10) Patent No.: US 9,062,715 B2
(45) Date of Patent: Jun. 23, 2015

(54) SPHERICAL ROLLER BEARING CAGE WITH CYLINDRICAL GUIDANCE CONTACT SURFACES

(71) Applicant: Baldor Electric Company, Fort Smith, AR (US)

(72) Inventors: William Gregory Hewitt, Taylors, SC (US); Christopher E. Hosmer, Greer, SC (US)

(73) Assignee: ABB Technology Ltd., Fort Smith, AR (US)

( * ) Notice: Subject to any disclaimer, the term of this patent is extended or adjusted under 35 U.S.C. 154(b) by 0 days.

(21) Appl. No.: 14/262,100

(22) Filed: Apr. 25, 2014

(65) Prior Publication Data
US 2014/0334762 A1    Nov. 13, 2014

Related U.S. Application Data

(63) Continuation of application No. 14/036,350, filed on Sep. 25, 2013.

(60) Provisional application No. 61/820,239, filed on May 7, 2013.

(51) Int. Cl.
*F16C 33/46*    (2006.01)

(52) U.S. Cl.
CPC ........... *F16C 33/467* (2013.01); *F16C 33/4676* (2013.01)

(58) Field of Classification Search
CPC .... F16C 23/082; F16C 23/084; F16C 23/086; F16C 23/088; F16C 33/4682
USPC .................. 384/558, 568, 571, 572, 574–576
See application file for complete search history.

(56) References Cited

U.S. PATENT DOCUMENTS

| | | | | |
|---|---|---|---|---|
| 4,684,268 | A | * | 8/1987 | Sahlgren et al. .............. 384/574 |
| 4,812,058 | A | * | 3/1989 | Hofmann et al. ............. 384/563 |
| 5,051,006 | A | | 9/1991 | Van Voorthuijsen |
| 5,234,274 | A | | 8/1993 | Honda et al. |
| 5,474,388 | A | | 12/1995 | Kellstrom et al. |
| 5,538,348 | A | | 7/1996 | Honda et al. |

(Continued)

FOREIGN PATENT DOCUMENTS

| | | |
|---|---|---|
| FR | 2925943 A1 | 7/2009 |
| WO | 2011/064133 A1 | 6/2011 |

OTHER PUBLICATIONS

U.S. Appl. No. 14/036,350, filed Sep. 25, 2013.

(Continued)

*Primary Examiner* — Phillip A Johnson
(74) *Attorney, Agent, or Firm* — Thompson Coburn LLP (57) ABSTRACT

A roller bearing cage has a cage element adapted for retaining the barrel-shaped rollers and allowing the rollers to be rollable therein. The cage element includes a main portion having a plurality of pockets, an outward flange portion extending outwardly in a radial direction and an inward flange portion extending inwardly in the radial direction. The outward flange portion being formed on a side edge of the main portion and the inward flange being formed on an opposite side edge portion thereof. The outward flange portion includes an outward flange guide surface for guiding barrel-shaped rollers. The guide surface is cylindrical in shape and adjacent each pocket. The guide surface is adapted to abut an axial end of the rollers.

21 Claims, 8 Drawing Sheets

(56) References Cited

U.S. PATENT DOCUMENTS

| | | |
|---|---|---|
| 5,586,826 A | 12/1996 | Kellstrom et al. |
| 5,626,426 A | 5/1997 | Honda et al. |
| 2008/0037921 A1 | 2/2008 | Hoshino |
| 2010/0074569 A1 | 3/2010 | Matsushita |
| 2011/0116734 A1 | 5/2011 | Umemoto et al. |
| 2011/0255820 A1 | 10/2011 | Caspall et al. |

OTHER PUBLICATIONS

International Search Report and Written Opinion for PCT/US2014/036611 dated Nov. 14, 2014.

* cited by examiner

SPHERICAL ROLLER BEARING CAGE WITH CYLINDRICAL GUIDANCE CONTACT SURFACES

RELATED APPLICATION DATA

This application is a continuation of application Ser. No. 14/036,350, filed Sep. 25, 2013, currently pending, and claims the benefit of provisional application Ser. No. 61/820,239, filed May 7, 2013, the disclosures of which are incorporated by reference herein.

BACKGROUND

This disclosure pertains to a roller bearing with an outer race, an inner race, a plurality of rollers, and a pair of cages. The cages have guide surfaces formed on outward flange portions of the cages for guiding the rollers. The guide surface have cylindrically shaped contact surfaces that contact the axial ends of the rollers, so the rollers can be guided with a full line of contact across the roller face whether the outer flange portion is in its designed position or skewed from loading or manufacturing inaccuracies.

DESCRIPTION OF THE DRAWINGS

The accompanying drawings, which are incorporated in and form a part of the specification, illustrate the embodiments. In the drawings.

DETAILED DESCRIPTION OF THE PREFERRED EMBODIMENT

Figure 1:
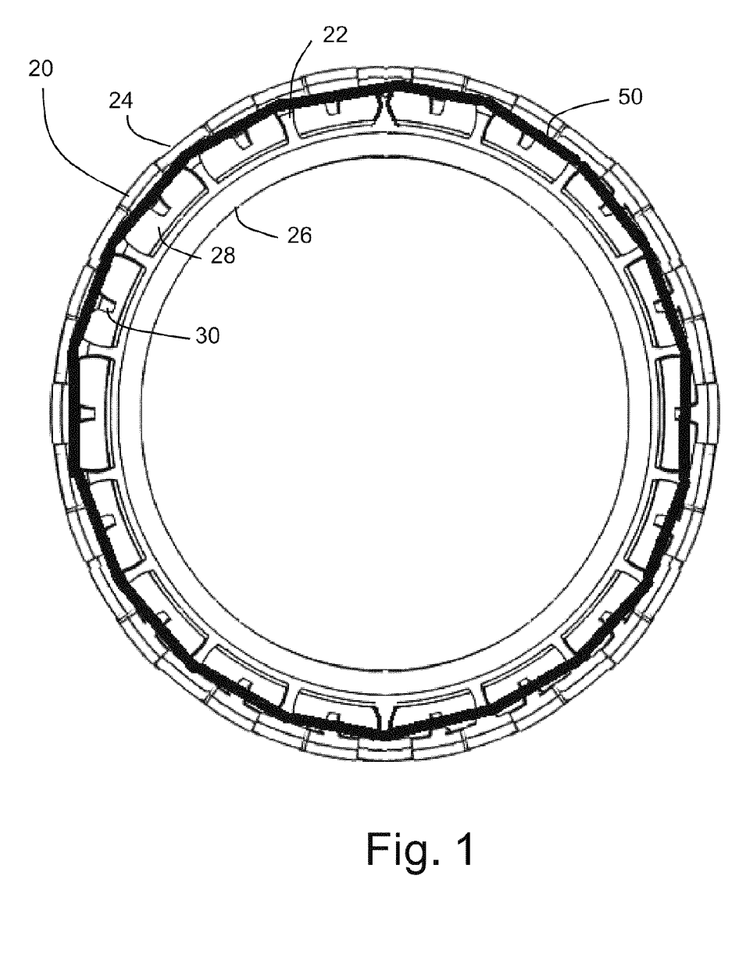
FIG. 1 illustrates a front view of a bearing cage.
Figure 2:
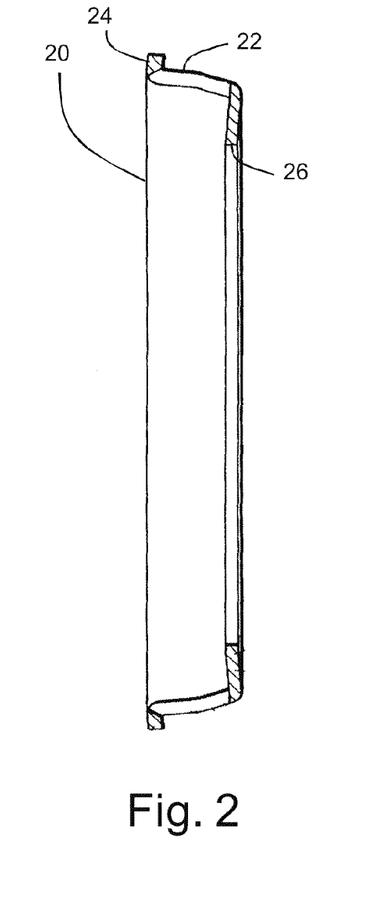
FIG. 2 illustrates a cross sectional view of the bearing cage of FIG. 1.

FIG. 1 shows an exemplary cage 20, which may be used for a roller bearing, for instance, a self-aligning spherical roller bearing. The cage 20 may be formed by press-molding or stamping a metal plate or by injection-molding a synthetic resin. The cage has a main portion 22, an outward flange portion 24 extending outwardly in the radial direction from a side of the main portion, and an inward flange portion 26 extending inwardly in the radial direction from the opposite side of the main portion. As shown in FIG. 2, the main portion may be conically shaped so the outward flange portion extends radially outward from the large diameter side of the main portion and the inward flange portion extends radially inward from the small diameter side of the main portion. The main portion may also be cylindrical rather than conical.

Figure 3:
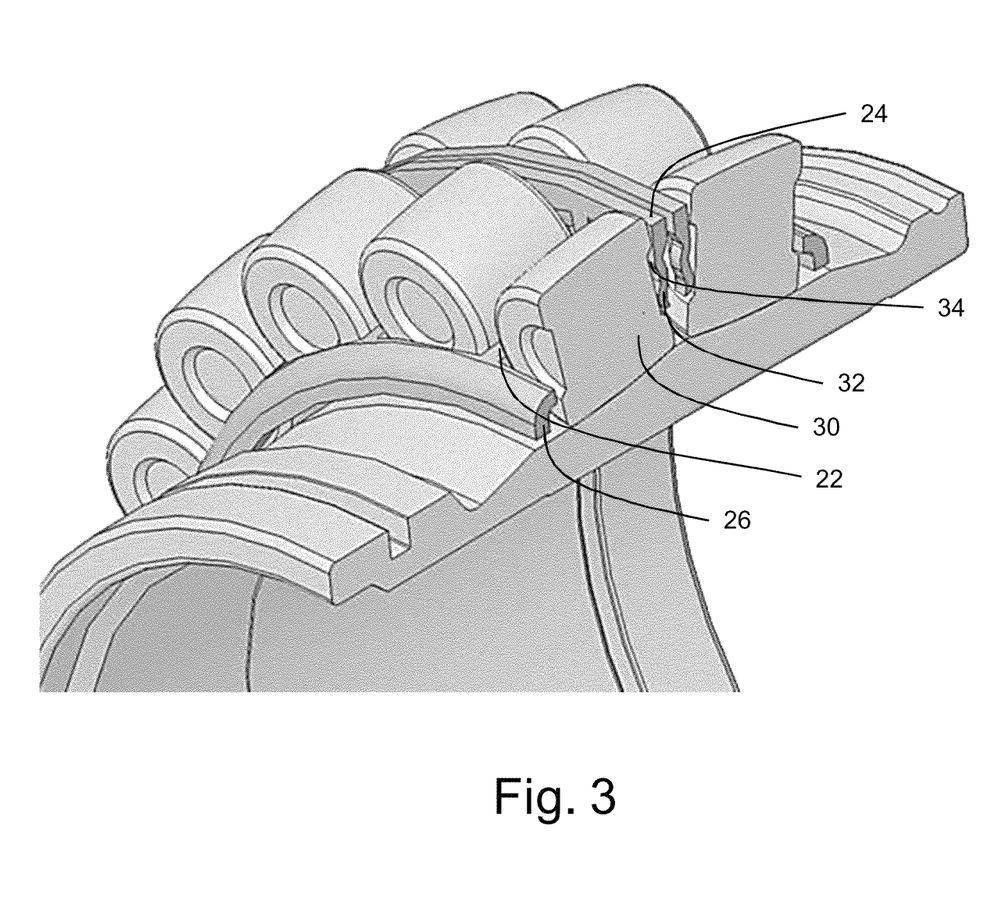
FIG. 3 illustrates the cage of FIG. 1 depicting in a cutaway fashion the roller/cage/inner ring assembly.
Figure 7:
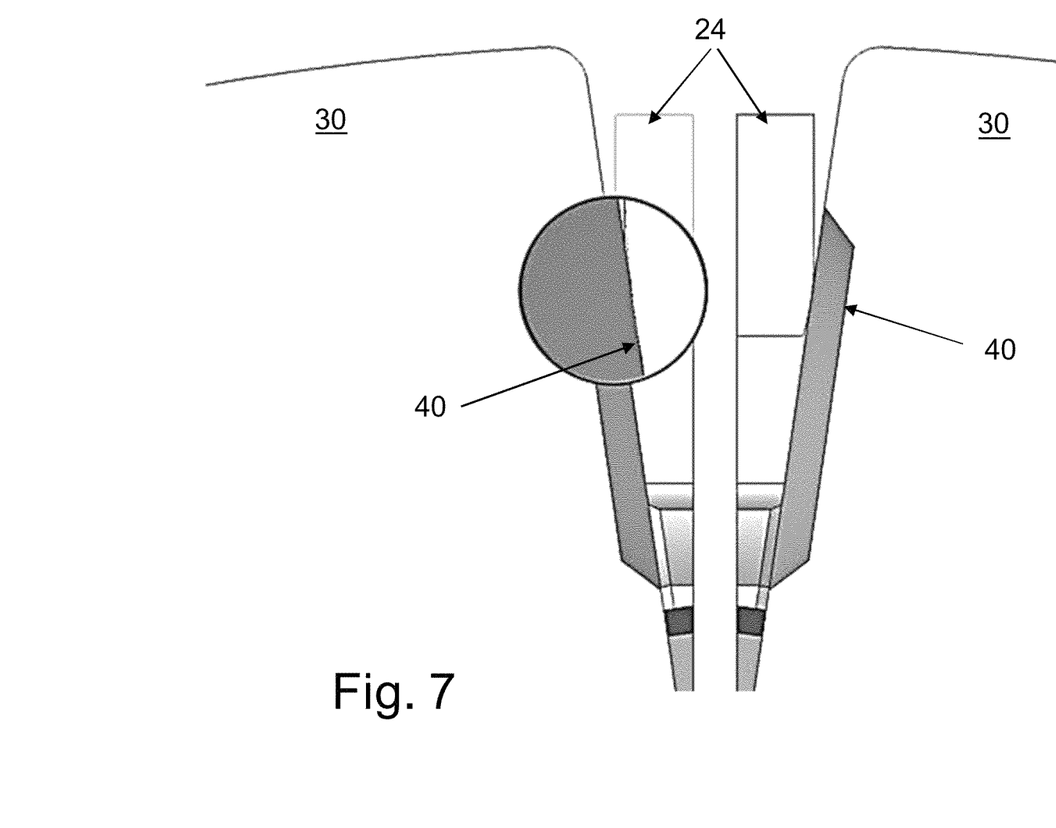
FIG. 7 is an enlarged detail side view of a roller/cage assembly with a further enlarged detail view of a cylindrically shaped guide surface contacting the rollers' axial face.

A plurality of pockets 28 (not shown in FIG. 2 for ease of illustration) is formed in the main portion 22. Each pocket retains 28 a single barrel-shaped roller 30 that is rollable therein. To prevent the barrel-shaped rollers from pulling out of the pockets in the radial direction, tongues or roller retainers 32 are formed on the inner circumferential edges of outward flange portion 24 to extend into the pockets. The roller retainers 32 are preferably arranged in the center of each of the pockets 28 and engage recessed portions 34 in axial faces of the rollers 30 (FIG. 3). The roller recess portions 34 may be circular in shape and located at the center of ends of the barrel-shaped rollers. The recesses formed on the ends of the barrel-shaped rollers may also have an annular shape that is concentric with the barrel-shaped rollers. When assembled in a bearing, the outward flange portions of a pair of cages are assembled with their outer flange portions in an abutting arrangement as shown in FIGS. 3 and 7.

Figure 4:
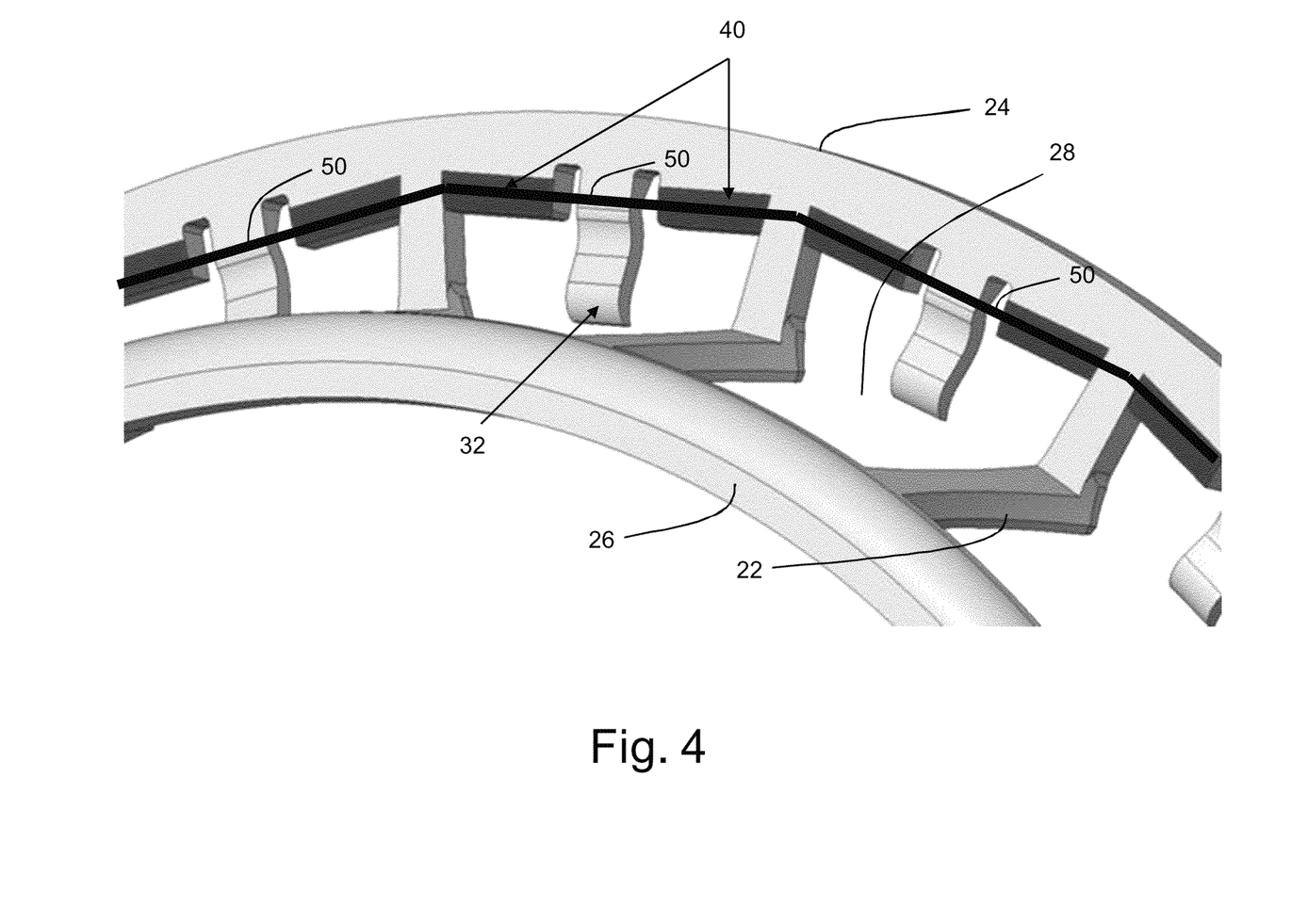
FIG. 4 is an enlarged detail view of an outward flange portion of the cage of FIG. 1.
Figure 8:
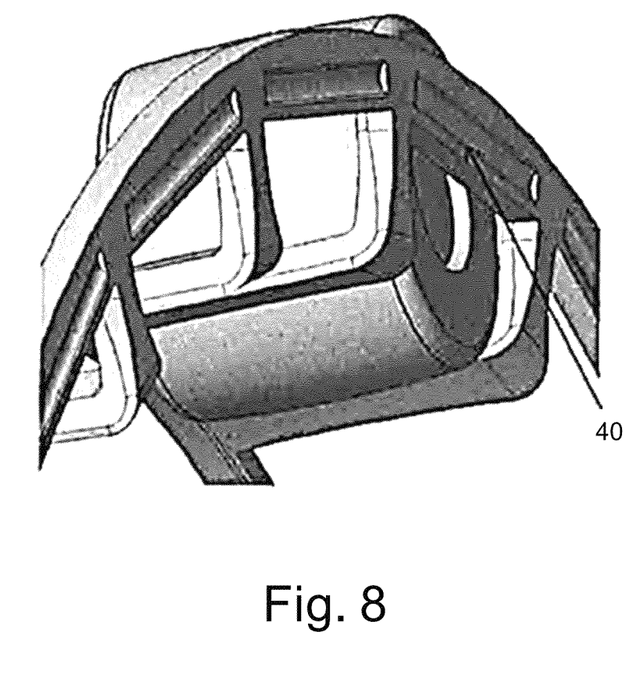
FIG. 8 is alternate embodiment of the cage where the guide surface extends across the full length of the pocket as a protrusion rather than being a coined surface formed in the outward flange portion.
Figure 9:
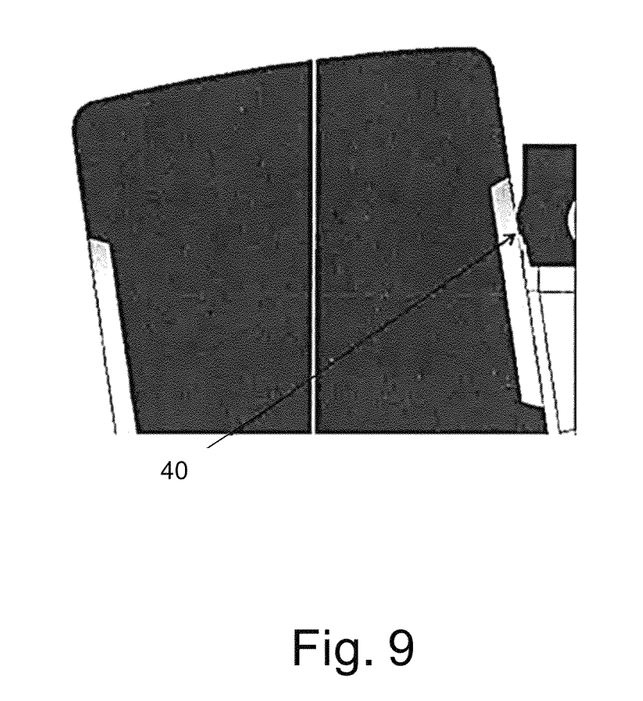
FIG. 9 is an enlarged detail side view of a roller/cage assembly of FIG. 8 with a further enlarged detail view of a cylindrically shaped guide surface contacting the roller's axial face.
Figure 10:
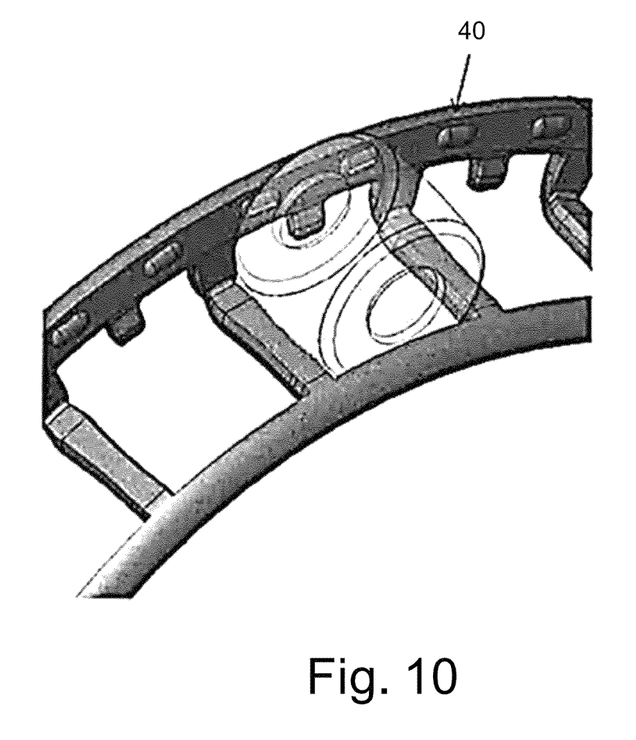
FIG. 10 is alternate embodiment of the cage where the guide surface comprises two or more protrusions that are intermittently spaced across the length of the pocket with a roller shown in phantom.
Figure 11:
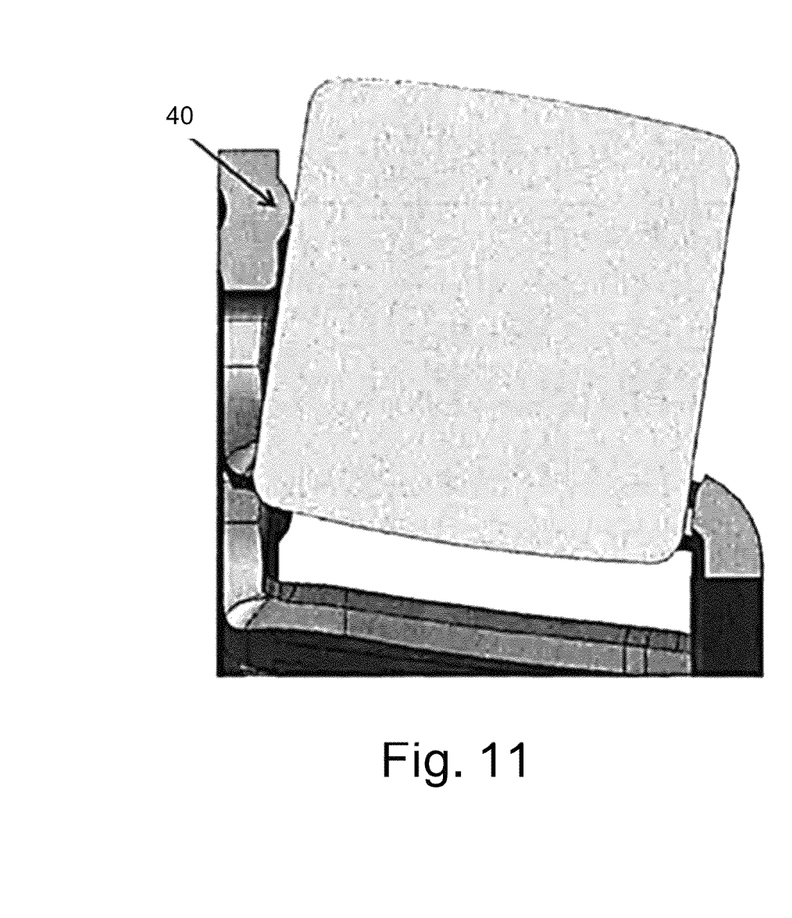
FIG. 11 is an enlarged detail side view of a roller/cage assembly of FIG. 10 with a further enlarged detail view of a cylindrically shaped guide surface contacting the roller's axial face.

As shown in FIG. 4, cylindrical shaped guide surfaces 40 are formed on the outward flange portion 24 adjacent the pockets 28 on the inner side surfaces of the outward flange portion. The guide surfaces may be coined into a cylindrical shape (FIG. 5) or otherwise formed as a protrusion (FIG. 8). The guide surfaces 40 may be continuous along the pocket 28 (FIG. 4) or may be intermittent (FIG. 10). As best shown in FIGS. 1 and 4, the guide surfaces 40 may be arranged in a straight line 50 across the pocket, thus defining a polygonal orientation of the guide surfaces on the outward flange. The number of sides to the polygon may correspond to the number of pockets and rollers of the bearing. As shown in FIG. 1, there are 18 pockets defining a 18 sided polygon. The guide surfaces are arranged to correspond to each side 50 of the polygon.

Figure 5:
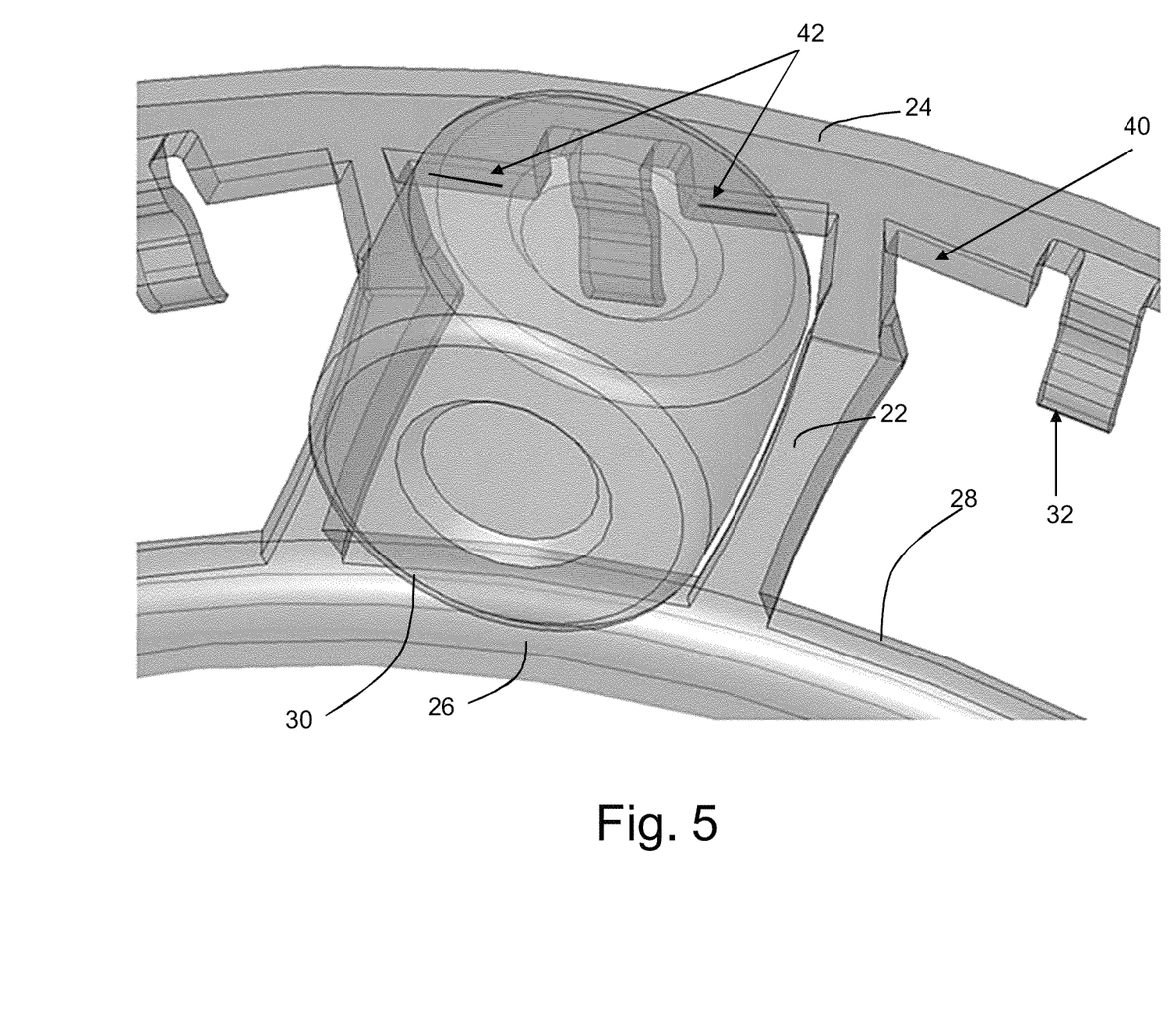
FIG. 5 is an enlarged detail view of the outward flange portion of the cage of FIG. 1 with a roller shown in phantom.
Figure 6:
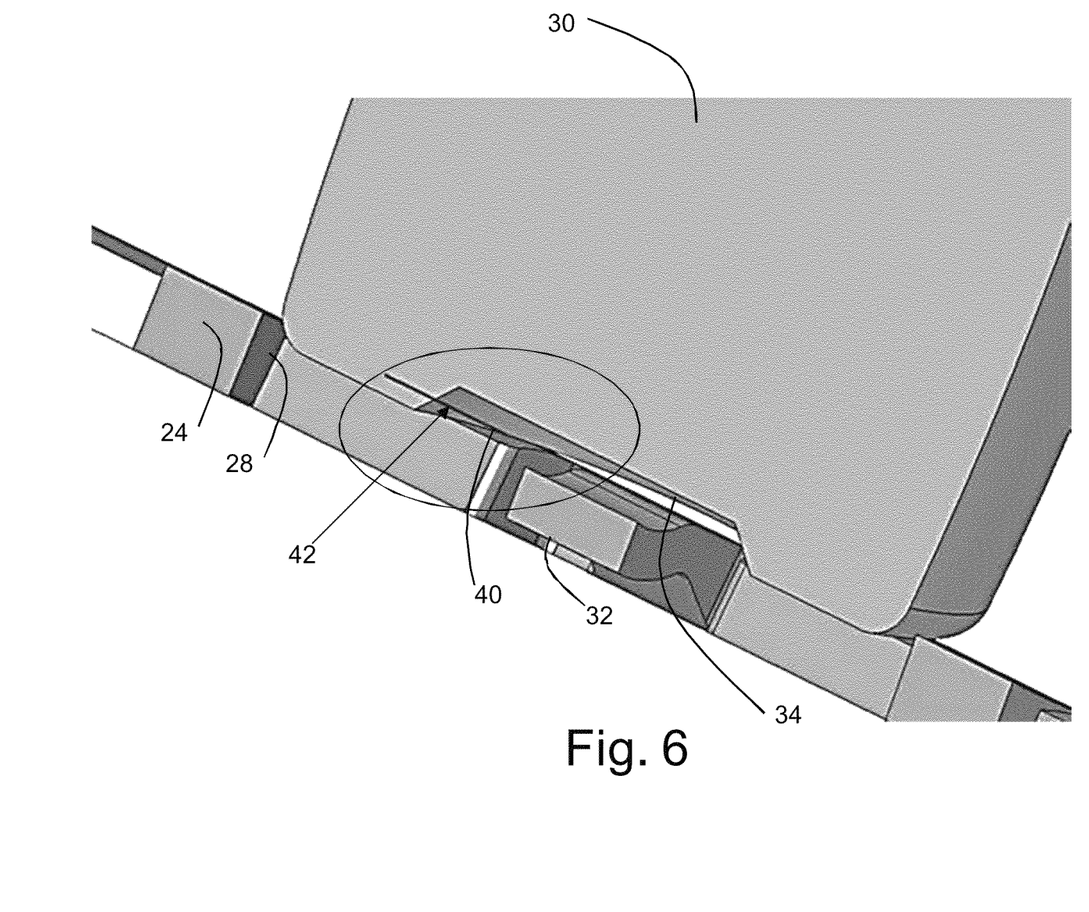
FIG. 6 is an enlarged detail view of the outward flange portion of the cage from the perspective of an inner diameter looking radially outward with a roller shown in cross section to illustrate the line contact created by a guide surface formed on the outward flange.

As best illustrated in FIGS. 4 and 5, the guide surfaces are cylindrically shaped and abut against the axial end faces of the rollers substantially uniformly with line contact 42 across the axial end surface of the roller. The line contact improves the lubrication film that should exist between the roller face and guide surfaces. Additionally, providing full line contact across the roller face allows the barrel-shaped rollers to be guided by the guide surfaces with minimal skew no matter if the flanged portion of the cage is stamped in position as designed or is leaning inward or outward. Further, the line of contact enables guiding of the rollers within greater manufacturing tolerances. For instance, a greater variation may be allowed in the stamping and the roller will contact the cylindrical guide surface at a different height on the roller but with full line contact. The cylindrical shape design enhances lubrication in between the roller and the cage guide surface regardless of the direction of rotation or manufacturing variance associated with the stamping.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A roller bearing with a cage comprising:
   an outer race;
   an inner race;
   a plurality of barrel-shaped rollers disposed between the outer raceway and the inner raceways; and
   a cage for retaining the barrel-shaped rollers and allowing the rollers to be rollable therein, the cage including a main portion having a plurality of pockets, an outward flange portion extending outwardly in a radial direction and an inward flange portion extending inwardly in the radial direction, the outward flange portion being formed on a side edge of the main portion and the inward flange being formed on an opposite side edge portion thereof, the outward flange portion includes an outward flange guide surface for guiding the barrel-shaped rollers, the guide surface being cylindrical in shape and adjacent each pocket, the guide surface abutting an axial end of the rollers.

2. The bearing of claim 1, wherein the outward flange guide surface is coined into the cylindrical shape.

3. The bearing of claim 1, wherein the outward flange guide surface has a length substantially equal to a length of the pocket.

4. The bearing of claim 1, wherein the outward flange guide surface comprises a plurality of nubs intermittently spaced across a length substantially equal to a length of the pocket.

5. The bearing of claim 1, wherein the guide surface comprises a line across the pocket.

6. The bearing of claim 1, wherein the inward flange portion includes an inward flange guide surface for guiding the barrel-shaped rollers, the inward flange guide surface being cylindrical in shape and adjacent each pocket, the inward flange guide surface abutting an axial end of the rollers.

7. The bearing of claim 6, wherein the inward flange guide surface is coined into the cylindrical shape.

8. The bearing of claim 6, wherein inward flange guide surface has a length substantially equal to a length of the pocket.

9. The bearing of claim 6, wherein inward flange guide surface comprises a plurality of nubs intermittently spaced across a length substantially equal to a length of the pocket.

10. The bearing of claim 1 wherein the guide surface of the pockets cumulatively form a polygonal orientation on the outward flange portion.

11. The bearing of claim 1, wherein each of the pockets includes a roller retainer that engages the rollers.

12. A roller bearing cage comprising:
    a cage element adapted to retain the barrel-shaped rollers and allow the rollers to be rollable therein, the cage element including a main portion having a plurality of pockets, an outward flange portion extending outwardly in a radial direction and an inward flange portion extending inwardly in the radial direction, the outward flange portion being formed on a side edge of the main portion and the inward flange being formed on an opposite side edge portion thereof, the outward flange portion includes an outward flange guide surface for guiding barrel-shaped rollers, the guide surface being cylindrical in shape and adjacent each pocket, the guide surface being adapted to abut an axial end of the rollers.

13. The cage of claim 12, wherein the outward flange guide surface is stamped into the cylindrical shape.

14. The cage of claim 12, wherein the outward flange guide surface has a length substantially equal to a length of the pocket.

15. The cage of claim 12, wherein the outward flange guide surface comprises a plurality of nubs intermittently spaced across a length substantially equal to a length of the pocket.

16. The cage of claim 12, wherein the inward flange portion includes an inward flange guide surface for guiding the barrel-shaped rollers, the inward flange guide surface being cylindrical in shape and adjacent each pocket, the inward flange guide surface abutting an axial end of the rollers.

17. The cage of claim 16, wherein the inward flange guide surface is stamped into the cylindrical shape.

18. The cage of claim 16, wherein inward flange guide surface has a length substantially equal to a length of the pocket.

19. The cage of claim 16, wherein inward flange guide surface comprises a plurality of nubs intermittently spaced across a length substantially equal to a length of the pocket.

20. The cage of claim 12, wherein the guide surface is arranged in a line across the pocket.

21. The cage of claim 12 wherein the guide surface of each of the pockets cumulatively define a polygon on the outward flange portion.

* * * * *